United States Patent
de Vulpillieres

(10) Patent No.: US 6,843,234 B1
(45) Date of Patent: Jan. 18, 2005

(54) FUEL INJECTOR INCLUDING A BENT INLET TUBE

(75) Inventor: Didier Jean de Vulpillieres, Williamsburg, VA (US)

(73) Assignee: Siemens VDO Automotive Corp., Auburn, MI (US)

( * ) Notice: Subject to any disclaimer, the term of this patent is extended or adjusted under 35 U.S.C. 154(b) by 0 days.

(21) Appl. No.: 10/633,627

(22) Filed: Aug. 5, 2003

(51) Int. Cl.[7] .............................................. F02M 55/04
(52) U.S. Cl. ........................ 123/468; 123/469; 123/470; 123/456
(58) Field of Search ............................... 123/456, 468, 123/469, 470

(56) References Cited

U.S. PATENT DOCUMENTS

| | | | |
|---|---|---|---|
| 4,205,637 A | | 6/1980 | Ito et al. |
| 4,295,452 A | | 10/1981 | Lembke et al. |
| 4,660,531 A | | 4/1987 | Lauterbach et al. |
| 4,909,221 A | | 3/1990 | Heuser |
| 4,922,876 A | | 5/1990 | Mizoguchi et al. |
| 4,938,193 A | * | 7/1990 | Raufeisen et al. .......... 123/470 |
| 5,033,435 A | | 7/1991 | Ostarello et al. |
| 5,297,523 A | | 3/1994 | Hafner et al. |
| 5,394,850 A | | 3/1995 | Murphy et al. |
| 5,765,534 A | | 6/1998 | Brown et al. |
| 5,771,863 A | * | 6/1998 | Daly .......................... 123/456 |
| 5,785,022 A | | 7/1998 | Haboush et al. |
| 5,819,708 A | | 10/1998 | Buratti et al. |
| 6,135,092 A | * | 10/2000 | Schaenzer et al. .......... 123/456 |
| 6,148,797 A | | 11/2000 | Gmelin |
| 6,186,118 B1 | | 2/2001 | Spakowski |
| 6,237,571 B1 | | 5/2001 | Harrison |

* cited by examiner

*Primary Examiner*—Thomas Moulis

(57) ABSTRACT

A fuel injector includes: a body that extends along a longitudinal axis between an inlet and an outlet; a seat, which is coupled to the body proximate the outlet, defines an opening through which fuel is adapted to flow into the internal combustion engine, an armature, which moves along the longitudinal axis between first and second configurations with respect to the seat; and an inlet tube assembly, which is coupled to the body proximate the inlet, includes first and second inlet tube members. The first inlet tube member extends along the longitudinal axis between proximal and distal ends, and the proximal end and the inlet of the body provide a first fluid-tight coupling. The second inlet tube member extends along a bending path between first and second end, and the first end and the distal end of the first inlet tube member provide a second fluid-tight coupling.

20 Claims, 5 Drawing Sheets

FUEL INJECTOR INCLUDING A BENT INLET TUBE

FIELD OF THE INVENTION

The present invention relates to fuel assemblies in which a fuel injector and a fuel rail are connected to each other in a non-traditional alignment. In particular, the present invention is directed to a bent arrangement for an inlet tube coupling a fuel injector to a fuel rail.

BACKGROUND OF THE INVENTION

Fuel injectors are used to provide precisely metered amounts of fuel relative to a supply of combustion air provided to an internal combustion engine. For a so-called "top feed" fuel injector, the fuel is provided to the fuel injector from a fuel rail connected to one end of the injector, typically called the inlet. The fuel injector meters the fuel from a distal end of the injector, typically called the outlet. The fuel may be metered directly into a combustion chamber or may be metered into an air intake passageway, e.g., in an intake manifold, where the fuel mixes with the combustion air prior to its introduction into the combustion chamber.

In a typical top feed injector fuel rail installation, the fuel rail includes a cup that engages, e.g., surrounds, the inlet of the fuel injector. The fuel rail cup/fuel inlet interface is made leak-proof through the use of a seal, typically an O-ring installed on the inlet of the fuel injector. A retaining device, such as a clip, may be used to secure each fuel injector with respect to its fuel rail cup.

Referring to FIG. 5, it is known to mount a fuel rail (FR) directly above a fuel injector (FI), i.e., in a plane that includes a longitudinal axis (LA) of the fuel injector (FI). It is believed that one reason for this known arrangement is because at least some parts of the fuel injector are "turned" parts, i.e., manufactured in a rotating process so as to be symmetrical about a rectilinear axis. Consequently, one disadvantage of known fuel injectors and fuel systems is their limited flexibility of the relative positioning of the fuel injectors with respect to fuel rails.

Thus, it is believed that there is a need to provide a fuel injector that can be located at various positions with respect to a fuel rail, e.g., offset or to the side of the longitudinal axis of a fuel injector.

SUMMARY OF THE INVENTION

The present invention provides an injector for a fuel injection system of an internal combustion engine. The fuel injection system includes a fuel rail that has a fuel rail cup in fluid communication with the fuel rail. The injector includes a body, a seat, an armature, and an inlet tube. The body extends along a longitudinal axis between an inlet and an outlet. The seat, which is coupled to the body proximate the outlet, defines an opening through which fuel is adapted to flow into the internal combustion engine. The armature, which moves along the longitudinal axis with respect to the seat, moves between a first configuration that prevents fuel flow through the opening and a second configuration that permits fuel flow through the opening. The inlet tube assembly, which is coupled to the body proximate the inlet, includes first and second inlet tube members. The first inlet tube member extends along the longitudinal axis between a proximal end and a distal end, and the proximal end and the inlet of the body provide a first fluid-tight coupling. The second inlet tube member extends along a bending path between a first end and a second end, and the first end and the distal end of the first inlet tube member provide a second fluid-tight coupling.

The present invention also provides a fuel injection system that supplies fuel from a fuel tank to an internal combustion engine. The fuel injection system includes a fuel rail and a fuel injector. The fuel rail, which is supplied with fuel from the fuel tank, includes a fuel rail cup. The fuel injector, which is adapted to dispense fuel into the internal combustion engine, includes a body and an inlet tube. The body extends along a longitudinal axis between an inlet and an outlet; and the inlet tube extends along a bending path between a first end and a second end. The first end is coupled to the body proximate the inlet, and the second end is coupled to the fuel rail cup such that fuel in the fuel rail is supplied via the fuel rail cup and the inlet tube to the outlet of the body. And the fuel rail is displaced from the longitudinal axis.

The present invention also provides a system for supplying fuel and air as combustion materials to an internal combustion engine including a cylinder head. The system includes a fuel injector and an intake manifold. The fuel injector, which dispenses the fuel into the internal combustion engine, includes a body and an inlet tube. The body extends along a longitudinal axis between an inlet and an outlet, and the outlet is coupled to the cylinder head. The inlet tube extends along a bending path between a first end and a second end, and the first end is coupled to the body proximate the inlet. The intake manifold, which is coupled to the cylinder head, has a body that defines first and second sets of passageways. The first set of passageways conveys the fuel to the internal combustion engine and includes a fuel cup that receives along a cup axis the second end of the inlet tube of the fuel injector. The second set of passageways conveys air to the internal combustion engine and is separate from the first set of passageways. And the cup axis extends obliquely with respect to the longitudinal axis.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

DETAILED DESCRIPTION OF THE PREFERRED EMBODIMENT

Figure 1:
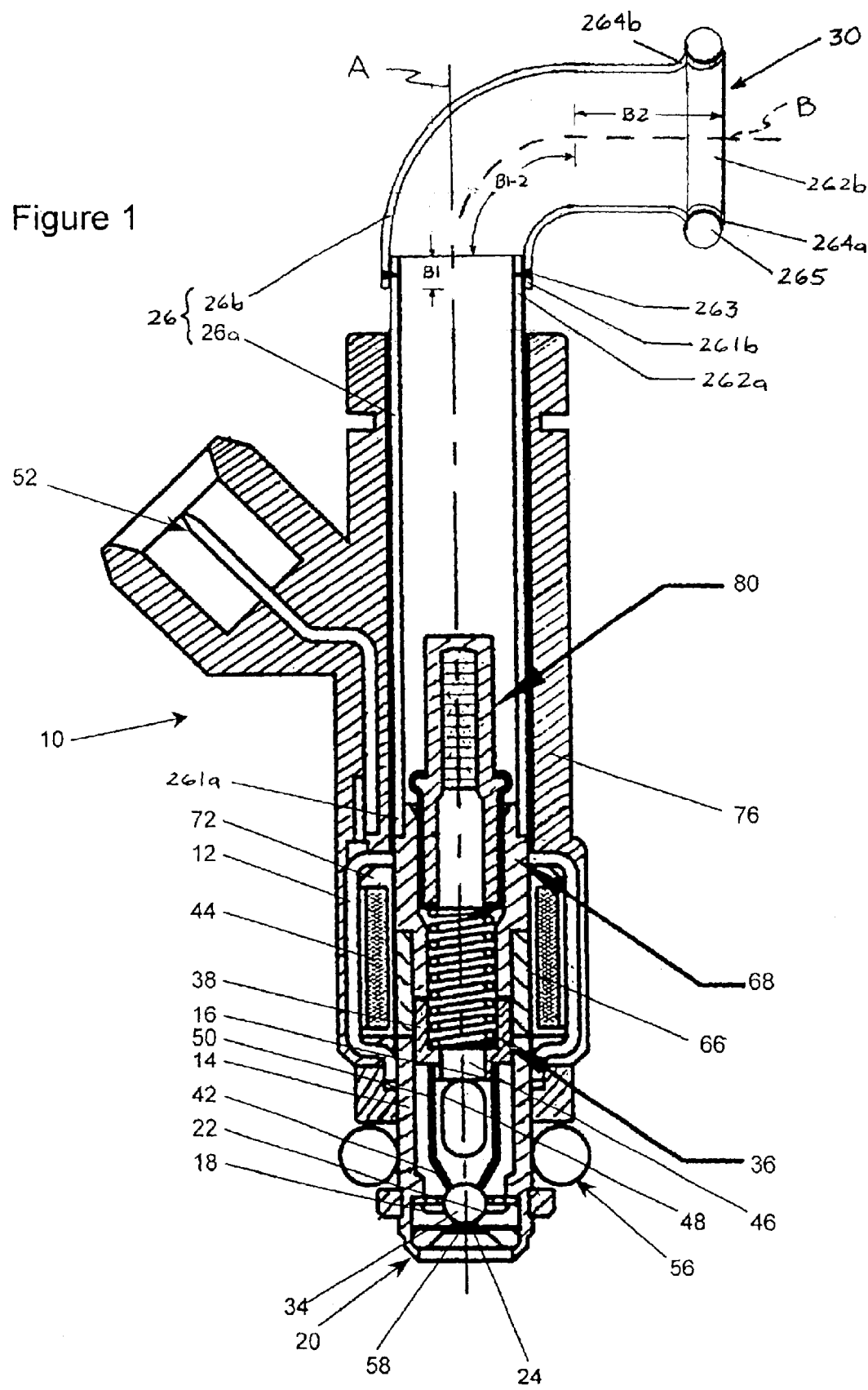
FIG. 1 is a schematic illustration of a fuel injector in accordance with a preferred embodiment.

Referring initially to FIG. 1, a solenoid actuated fuel injector 10, which can be of the so-called top feed type, includes a housing 12 that extends along a longitudinal axis A and a valve body 14 fixed to the housing 12. The valve body 14 has a cylindrical sidewall 16 that is coaxial with and confronts a longitudinal axis A of the housing 12 and the valve body 14.

A valve seat 18 at one end 20 of the valve body 14 includes a seating surface 22 that can have a frustoconical or concave shape facing the interior of the valve body 14. The seating surface 22 includes a fuel outlet opening 24 that is centered on the axis A and is in fluid communication with an inlet tube assembly 26, which will be described in greater detail hereinafter, that receives pressurized fuel into the fuel injector 10.

A closure member, e.g., a spherical valve ball 34, is moveable along the axis A with respect to the valve seat 18 between a closed and open configurations. In the closed configuration, the ball 34 is urged against the seating surface 22 to prevent fuel flow through the outlet opening 24. In the open configuration, the ball 34 is spaced from the seating surface 22 to permit fuel flow through the outlet opening 24. An armature 38 that is axially moveable in the valve body 14 can be fixed to the valve ball 34 at an end 42 proximate the seating surface 22. A resilient member 36 can engage the armature 38 for biasing the valve ball 34 toward the closed position.

A solenoid coil 44 is operable to draw the armature 38 away from the seating surface 22, thereby moving the valve ball 34 to the open configuration and allowing fuel to pass through the fuel outlet opening 24. De-energizing the solenoid coil 44 allows the resilient biasing member 36 to return the valve ball 34 to the closed configuration, thereby closing the outlet opening 24 against the passage of fuel.

The armature 38 includes an axially extending through-bore 46 providing a passage in fluid communication with the fuel tube 26. Through-bore 46 can also receive and center the valve ball 34. A fuel passage 48 extends from the through-bore 46 to an outer surface 50 of the armature 38 that is juxtaposed to the seating surface 22, allowing fuel to be communicated through the armature 38 to the valve ball 34.

With further reference to FIG. 1, an electrical connector 52 is provided for connecting the fuel injector 10 to an electrical power supply (not shown) in order to energize the armature 38. An O-ring 56 can be used to seal the fuel injector 10 in an intake manifold. An orifice disk 58 may be provided proximate the outlet opening 24 for controlling the fuel communicated through the outlet opening 24. The orifice disk 58 can be directly welded to the valve seat 18, or a back-up washer (not shown), which is fixed to the valve body 14, can be used to press the orifice disk 58 against the valve seat 18.

The injector 10 maybe made of two subassemblies that are separately assembled, then fastened together to form the injector 10. Accordingly, the injector 10 includes a valve group subassembly and a coil subassembly as hereinafter more fully described.

The valve group subassembly is constructed as follows. The valve seat 18 is loaded into the valve body 14, held in a desired position, and connected, e.g., by laser welding. Separately, the valve ball 34 is connected, e.g., by laser welding, to the armature 38. The armature 38 and valve ball 34 are then loaded into the valve body 14 including the valve seat 18.

A non-magnetic sleeve 66 is pressed onto one end of a pole piece 68, and the non-magnetic sleeve 66 and the pole piece 68 are welded together. The pole piece 68 is shown as an independent element that is connected, e.g., by laser welding, to the fuel tube 26. Alternatively, the lower end of the fuel tube 26 can define the pole piece 68, i.e., the pole piece 68 and fuel tube 26 can be formed as a single, homogenous body. The non-magnetic sleeve 66 is then pressed onto the valve body 14, and the non-magnetic sleeve 66 and valve body 14 are welded together to complete the assembly of the valve group subassembly. The welds can be formed by a variety of techniques including laser welding, induction welding, spin welding, and resistance welding.

The coil group subassembly is constructed as follows. A plastic bobbin 72 is molded with straight terminals. Wire for the coil 44 is wound around the plastic bobbin 72 and this bobbin assembly is placed into a metal can, which defines the housing 12. A metal plate that defines the housing cover 74 is pressed onto the housing 12. The terminals can then be bent to their proper arrangement, and an over-mold 76 covering the housing 12 and coil 44 can be formed to complete the assembly of the coil group subassembly.

The inlet tube assembly 26 includes a first inlet tube member 26a that extends along the axis A between a proximal end 261a and distal end 262a. A first fluid-tight coupling is provided at the interface of the proximal end 261a and the pole piece 68. The inlet tube assembly 26 also includes a second inlet tube member 26b that extends along a bending path B between a first end 261b and a second end 262b. A second fluid-tight coupling is provided at the interface of the distal end 262a and the first end 261b. Preferably, the first fluid-tight coupling includes an interference fit and the second fluid-tight coupling includes a weld 263, and more preferably a hermetic weld.

Proximate the second end 262b of the second inlet tube member 26b, there may a first flare 264a and a second flare 264b that define a groove that receives an O-ring 265, which is used to form third fluid-tight seal between the second end 262b of the second inlet tube member 26b and a fuel rail cup of a fuel rail.

Preferably, the bending path B includes a first portion B1 proximate the first end 261b of the second inlet tube member 26b, a second portion B2 proximate the second end 262b of the second inlet tube member 26b, and an intermediate portion B1-2 between the first and second portions B1,B2. The first portion B1 of the bending path B is a rectilinear segment that is substantially coincident with the longitudinal axis A. The second portion B2 of the bending path B is a segment that extends along an axis that is not coincident with the longitudinal axis A. Preferably, the second portion B2 of the bending path B extends obliquely with respect to the longitudinal axis A, and the intermediate portion B1-2 is an arcuate segment.

Figures 2A, 2B:
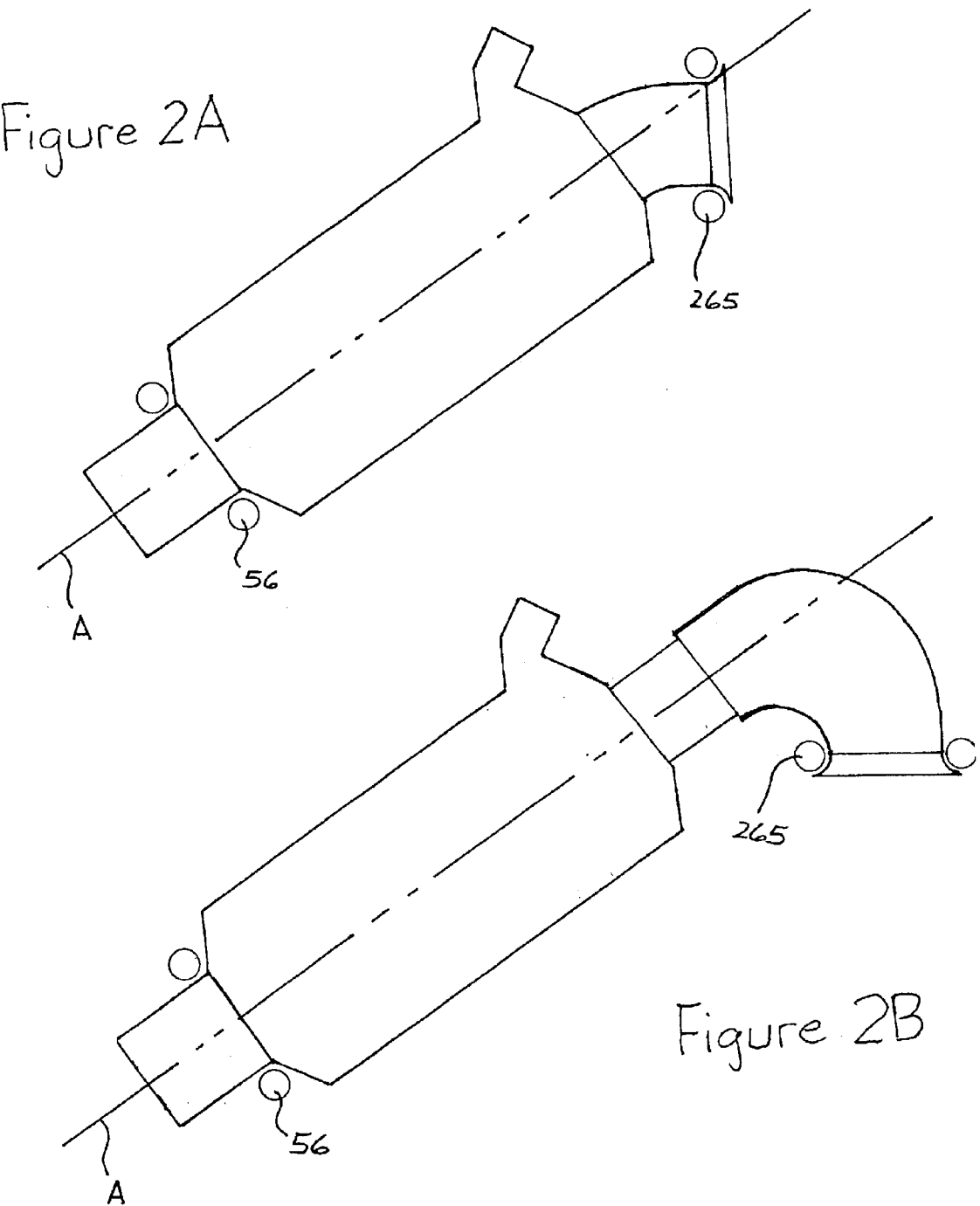
FIG. 2A is a schematic illustration of a first variation of the fuel injector shown in FIG. 1.
FIG. 2B is a schematic illustration of a second variation of the fuel injector shown in FIG. 1.

FIGS. 2A and 2B show two exemplary variations of the possible angular and positional relationship between the first and second ends 261b,262b of the second inlet tube member 26b. Of course, the other relative variations are possible to accommodate a desired location of a fuel rail with respect to the fuel injector 10.

Figure 3:
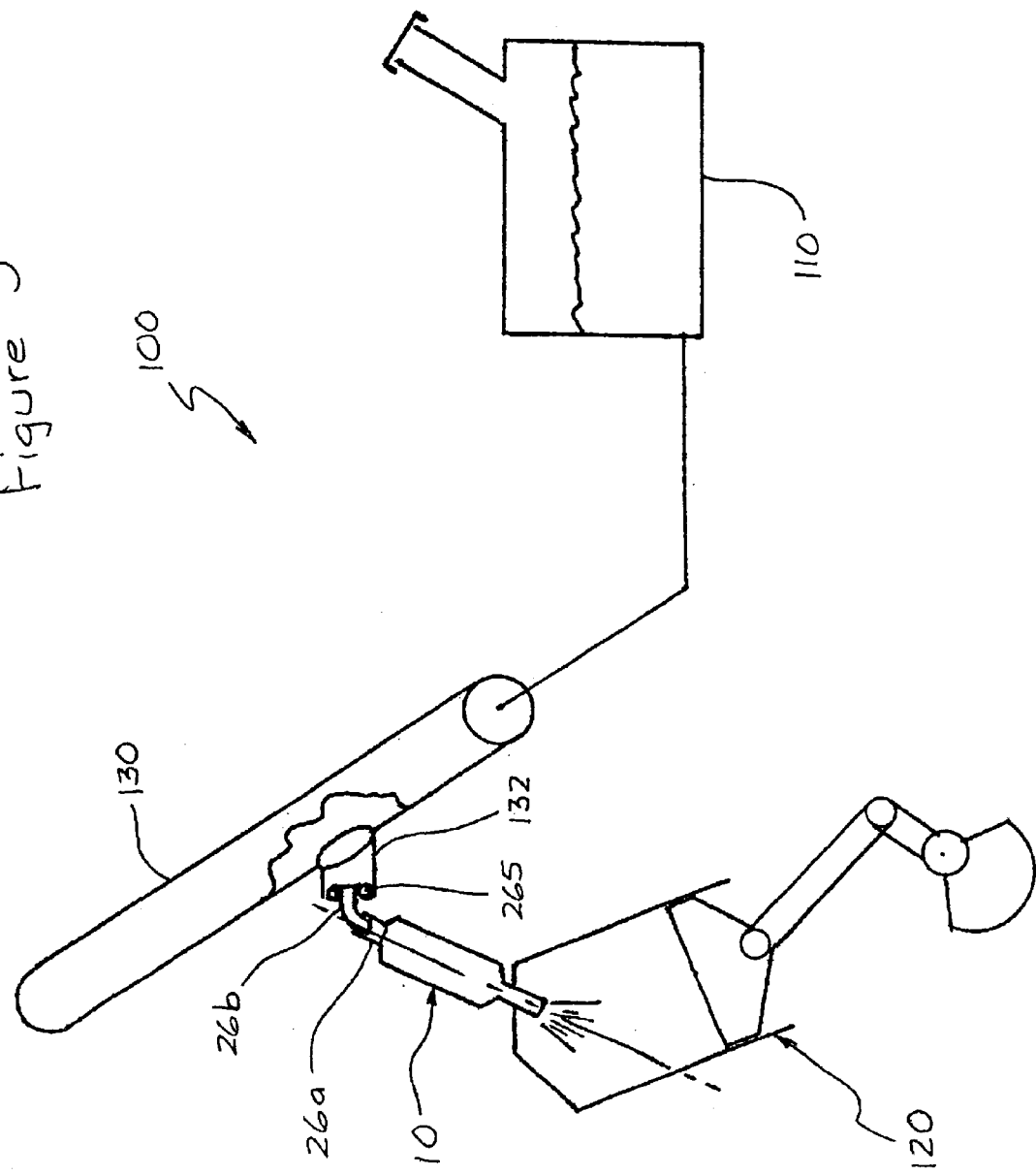
FIG. 3 is a schematic illustration of a portion of a fuel system in accordance with a first preferred embodiment.

FIG. 3 shows a fuel injection system 100 that supplies fuel from a fuel tank 110 to an internal combustion engine 120. The fuel injection system 110 includes a fuel rail 130 in fluid communication between the fuel tank 110 and an injector 10 according to the present invention. The fuel rail includes at least one fuel rail cup 132 that is sized and oriented to engage a respective O-ring 265, and thereby provide a fluid-tight coupling between the second inlet tube member 26b and the fuel rail cup 132.

An advantage of the present invention is easing installation by being able to locate the fuel rail 130 relative to the fuel injector 10 at positions other an in a plane including the longitudinal axis A. That is to say, the fuel rail 130 may be located, for example, to the side or next to the fuel injector 10, something that is, at best, difficult to achieved with known fuel rails and fuel rail cups. Another advantage of the present invention is that the second inlet tube member 26b can be bent to almost any arrangement, and it does not have a significant adverse effect on the performance or the cost of the fuel injector 10. Yet another advantage of the present invention is that the second inlet tube 26b, by virtue of its non-coincident relationship with the longitudinal axis A, can provide automatic and accurate angular positioning about the longitudinal axis A for the fuel injector 10, and thereby ensure that a particular fuel spray pattern is properly oriented with respect to a combustion chamber of the internal combustion engine 120.

Figure 4:
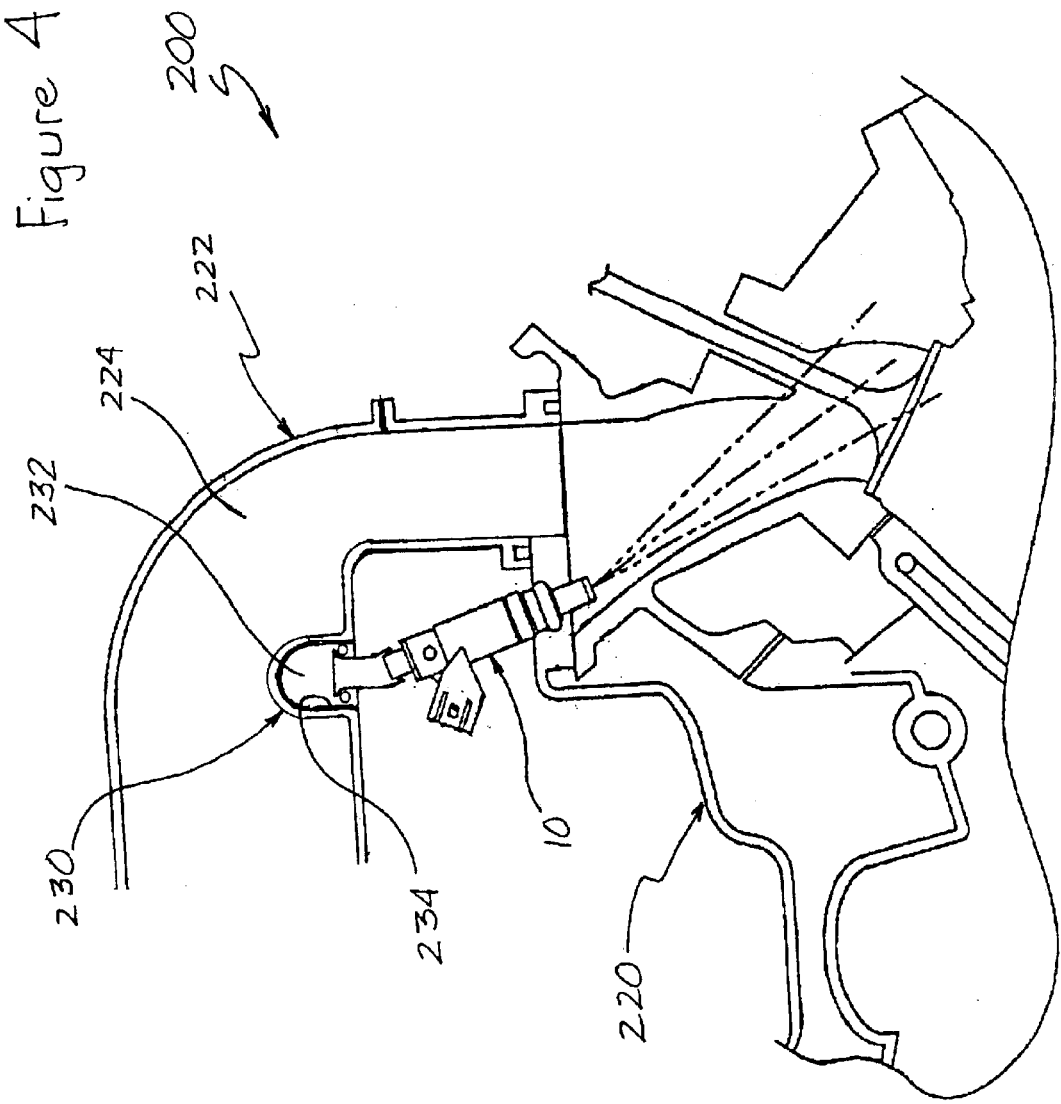
FIG. 4 is a schematic illustration of a portion of a fuel system in accordance with a second preferred embodiment.
Figure 5:
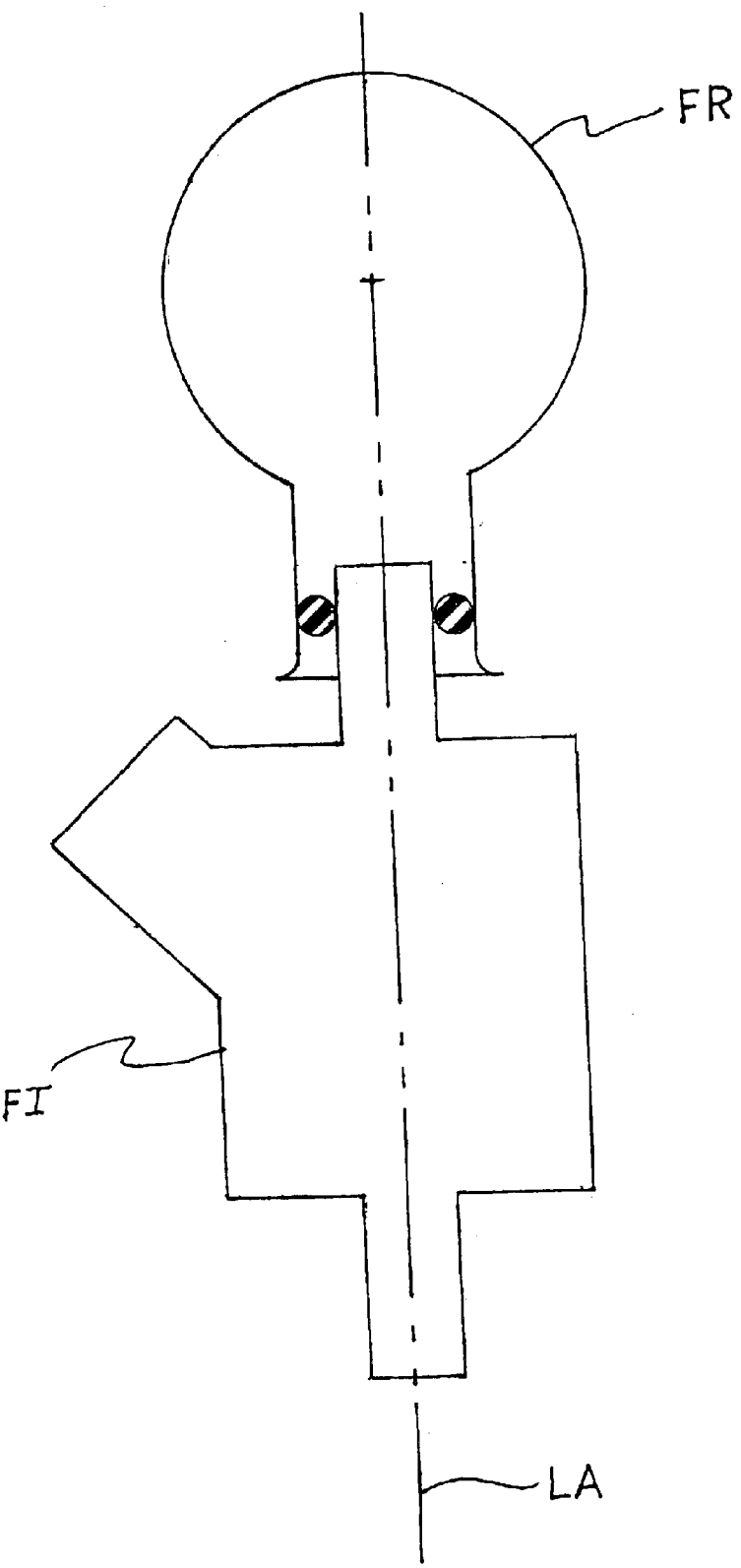
FIG. 5 is a schematic illustration of a known fuel system.

FIG. 4 shows a fuel injection system 200 in which the fuel rail 230 is defined by a first set of passageways 232 in an intake manifold 222 of an internal combustion engine 220. A second, separate set of passageways 224 in the intake manifold 222 conveys combustion air to the internal combustion engine 220. The intake manifold 222 is further formed so as to define at least one fuel cup 234 that is sealing coupled to a fuel injector 10 according to the present invention. Consequently, an advantage of the fuel injection system 220 is that the fuel rail 230 can be embedded in the intake manifold 222, thus improving the ability to maintain the structure in the event of a vehicle crash that might otherwise result in a fuel rail being punctured or otherwise damaged.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

What is claimed is:

1. An injector for a fuel injection system of an internal combustion engine, the fuel injection system including a fuel rail having a fuel rail cup in fluid communication with the fuel rail, the injector comprising:
    a body extending along a longitudinal axis between an inlet and an outlet;
    a seat coupled to the body proximate the outlet, the seat defining an opening through which fuel is adapted to flow into the internal combustion engine;
    an armature assembly movable along the longitudinal axis with respect to the seat, the armature assembly being movable between a first configuration preventing fuel flow through the opening and a second configuration permitting fuel flow through the opening; and
    an inlet tube assembly coupled to the body proximate the inlet, the inlet tube assembly including:
        a first inlet tube member extending along the longitudinal axis between a proximal end and a distal end, the proximal end and the inlet of the body providing a first fluid-tight coupling; and
        a second inlet tube member extending along a bending path between a first end and a second end, the first end and the distal end of the first inlet tube member providing a second fluid-tight coupling.

2. The injector according to claim 1, wherein the first fluid-tight coupling comprises an interference fit, and the second fluid-tight coupling comprises a weld.

3. The injector according to claim 2, wherein the weld comprises a hermetic weld.

4. The injector according to claim 1, wherein the second end of the second inlet tube member comprises first and second flares, the first flare is located at a terminus of the second end, and the second flare is located between the first flare and the first end of the second inlet tube member.

5. The injector according to claim 4, wherein the first and second flares define a groove circumscribing the second end of the second inlet tube member.

6. The injector according to claim 5, comprising:
    an O-ring received in the groove, the O-ring being adapted to form a fluid tight seal between the second end of the inlet tube member and the fuel rail cup of the fuel rail.

7. The injector according to claim 1, wherein the bending path comprises a first portion proximate the first end of the second inlet tube member and a second portion proximate the second end of the second inlet tube member, the first portion of the bending path comprises a first segment that is substantially coincident with the longitudinal axis, and the second portion of the bending path comprises a second segment that extends along an oblique axis with respect to the longitudinal axis.

8. The injector according to claim 7, wherein the second segment comprises a rectilinear segment that is angularly oriented with respect to the longitudinal axis.

9. The injector according to claim 7, wherein the bending path comprises an intermediate portion between the first and second portions, the intermediate portion comprising an arcuate segment.

10. The injector according to claim 1, wherein the second end comprises a terminus defining a port lying in a plane that is obliquely oriented with respect to the longitudinal axis.

11. The injector according to claim 1, comprising:
    a resilient member biasing the armature assembly toward the first configuration, and the first end of the first inlet tube member contiguously engages the resilient member.

12. A fuel injection system for supplying fuel from a fuel tank to an internal combustion engine, the fuel injection system comprising:
    a fuel rail adapted to be supplied with fuel from the fuel tank, the fuel rail including a fuel rail cup; and
    a fuel injector adapted to dispense fuel into the internal combustion engine, the fuel injector including:
        a body extending along a longitudinal axis between an inlet and an outlet; and
        an inlet tube extending along a bending path between a first end and a second end, the first end being coupled to the body proximate the inlet, and the second end being coupled to the fuel rail cup such that fuel in the fuel rail is supplied via the fuel rail cup and the inlet tube to the outlet of the body;
    wherein the fuel rail is displaced from the longitudinal axis.

13. The fuel injection system according to claim 12, wherein the fuel injector comprises a seat and an armature, the seat is coupled to the body proximate the outlet and defines an opening through which fuel is adapted to flow into the internal combustion engine, the armature moves along the longitudinal axis with respect to the seat between a first configuration preventing fuel flow through the opening and a second configuration permitting fuel flow through the opening.

14. The fuel injection system according to claim 12, comprising:
    an O-ring providing a fluid tight seal between the inlet tube and the fuel rail cup.

15. The fuel injection system according to claim 12, wherein the bending path comprises a first portion proximate the inlet of the body and a second portion proximate the fuel rail cup, the first portion of the bending path comprises a first segment that is substantially coincident with the longitudinal axis, and the second portion of the bending path comprises a second segment that extends obliquely with respect to the longitudinal axis.

16. The fuel injection system according to claim 15, wherein the second segment comprises a rectilinear segment that is angularly oriented with respect to the longitudinal axis.

17. The fuel injection system according to claim 16, wherein the fuel rail cup extends along the rectilinear segment that is angularly oriented with respect to the longitudinal axis.

18. The fuel injection system according to claim 15, wherein the bending path comprises an intermediate portion between the first and second portions, the intermediate portion comprising an arcuate segment.

19. A system for supplying fuel and air as combustion materials to an internal combustion engine including a cylinder head, the system comprising:

a fuel injector adapted to dispense the fuel into the internal combustion engine, the fuel injector including:

a body extending along a longitudinal axis between an inlet and an outlet, the outlet being adapted to be coupled to the cylinder head; and an inlet tube extending along a bending path between a first end and a second end, the first end being coupled to the body proximate the inlet; and an intake manifold adapted to be coupled to the cylinder head, the intake manifold having a body defining:

a first set of passageways adapted to convey the fuel to the internal combustion engine, the first set of passageways including a fuel cup receiving the second end of the inlet tube of the fuel injector along a cup axis, and the cup axis extending obliquely with respect to the longitudinal axis; and a second set of passageways adapted to convey air to the internal combustion engine, the second set of passageways being separate from the first set of passageways.

20. The system according to claim 19, wherein the fuel injector comprises a seat and an armature, the seat is coupled to the body proximate the outlet and defines an opening through which fuel is adapted to flow into the internal combustion engine, the armature moves along the longitudinal axis with respect to the seat between a first configuration preventing fuel flow through the opening and a second configuration permitting fuel flow through the opening.

* * * * *